(12) United States Patent
Marty et al.

(10) Patent No.: US 9,535,429 B2
(45) Date of Patent: Jan. 3, 2017

(54) WATER PRESSURE CONTROLLED MIXING VALVE

(71) Applicant: Delta Faucet Company, Indianapolis, IN (US)

(72) Inventors: Garry R. Marty, Fishers, IN (US);
Joel D. Sawaski, Indianapolis, IN (US);
Jeffrey J. Belz, Eastpointe, MI (US);
David M. Groves, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 299 days.

(21) Appl. No.: 14/194,173

(22) Filed: Feb. 28, 2014

(65) Prior Publication Data

US 2014/0251475 A1    Sep. 11, 2014

Related U.S. Application Data

(60) Provisional application No. 61/775,093, filed on Mar. 8, 2013.

(51) Int. Cl.
*G05D 23/13* (2006.01)
*F16K 11/07* (2006.01)

(52) U.S. Cl.
CPC ...... *G05D 23/1313* (2013.01); *G05D 23/1393* (2013.01); *F16K 11/0716* (2013.01); *Y10T 137/86485* (2015.04)

(58) Field of Classification Search
CPC ....... F16K 11/00; F16K 11/02; F16K 11/0716; F16K 19/006; G05D 23/13; G05D 23/1393

USPC ............. 236/12.1, 12.11, 12.12, 12.16, 12.2, 236/12.21, 12.23

See application file for complete search history.

(56) References Cited

U.S. PATENT DOCUMENTS

| | | | |
|---|---|---|---|
| 962,111 A * | 6/1910 | Assmann | G05D 11/132 137/100 |
| 3,006,373 A | 10/1961 | Ehlke | |
| 3,036,777 A | 5/1962 | Budde | |
| 3,322,342 A | 5/1967 | Veale | |
| 3,581,759 A | 6/1971 | Veale | |
| 3,805,836 A | 4/1974 | Veale | |
| 3,856,201 A | 12/1974 | Genever-Watling et al. | |
| 3,888,278 A | 6/1975 | Hanks | |
| 4,711,392 A * | 12/1987 | Kidouchi | F16K 11/20 137/332 |
| 4,909,435 A | 3/1990 | Kidouchi et al. | |
| 6,290,139 B1 | 9/2001 | Kolze | |
| 7,832,651 B2 | 11/2010 | Rivlin | |
| 8,043,556 B2 | 10/2011 | Peel et al. | |
| 8,302,627 B2 | 11/2012 | Stretch | |

FOREIGN PATENT DOCUMENTS

| | | |
|---|---|---|
| DE | 2725046 | 12/1978 |
| DE | 2821692 | 11/1979 |

* cited by examiner

*Primary Examiner* — Jonathan Bradford
(74) *Attorney, Agent, or Firm* — Faegre Baker Daniels

(57) ABSTRACT

A water pressure controlled valve including a housing and a piston slidably received within the housing. First and second water control chambers are positioned on opposite ends of the piston and are fluidly coupled to first and second water control valves, respectively. Operation of the first and second water control valves controls water pressure in the first and second water control chambers to cause sliding movement of the piston and control water supplied to a water outlet.

10 Claims, 15 Drawing Sheets

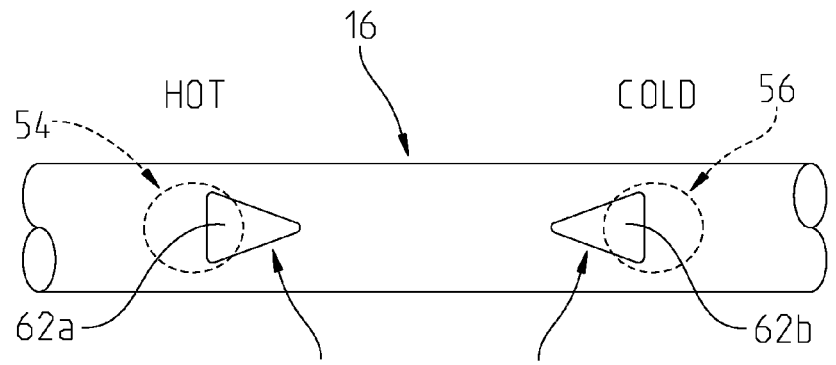
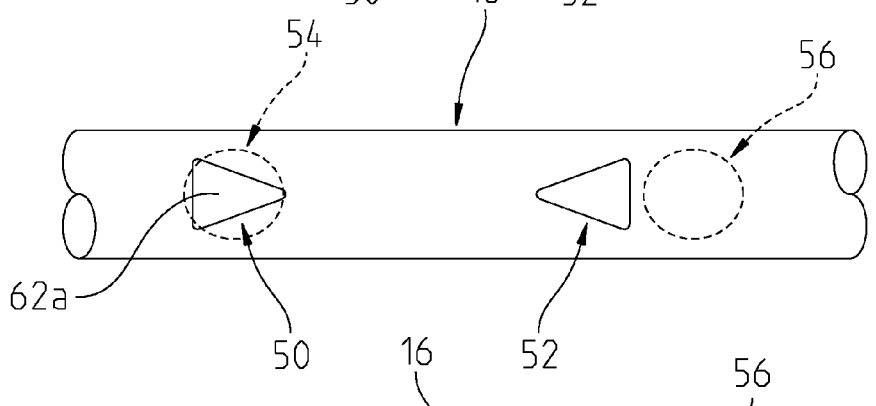
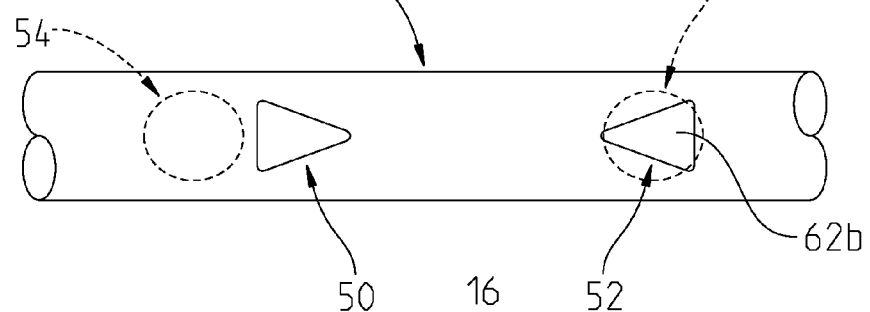
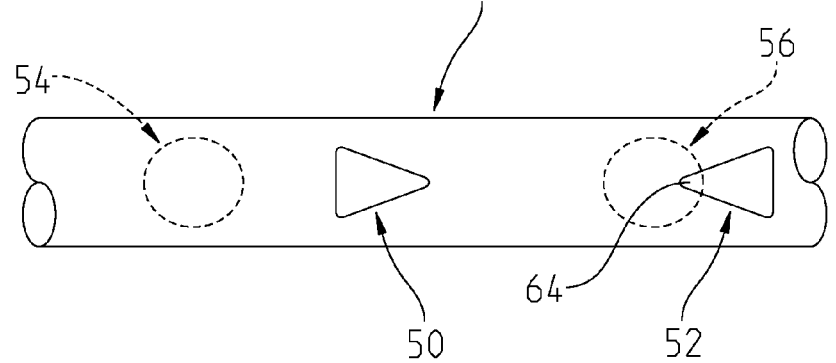

WATER PRESSURE CONTROLLED MIXING VALVE

CROSS-REFERENCE TO RELATED APPLICATION

The present application claims priority to U.S. Provisional Patent Application Ser. No. 61/775,093, filed Mar. 8, 2013, the disclosure of which is expressly incorporated herein by reference.

BACKGROUND AND SUMMARY OF THE DISCLOSURE

The present invention relates generally to mixing valves for use with faucets and, more particularly, to a mixing valve controlling temperature by utilizing water pressure to move a control piston.

The present disclosure provides for temperature control of outlet water from a faucet by using water pressure to move a control port supported by a piston. More particularly, a plurality of electrically operable valves are utilized to control water flow to the outlet of a faucet. Illustratively, a first electrically operable valve moves the piston towards a hot water position, a second electrically operable valve moves the piston towards a cold water position, and a third electrically operable valve activates and/or deactivates water flow.

In an illustrative embodiment of the present disclosure, a mixing valve utilizes hydraulic forces to control the positioning of outlet openings relative to control ports which, in turn, controls the temperature of the water. Rather than controlling the mixed temperature by rotating hot and cold water ports, linear displacement of control ports controls water temperature. As the control ports move axially back and forth, the proportion of hot and cold water exiting a control chamber varies, thereby changing the temperature of the outlet water. More particularly, solenoid valves on opposing sides of the control ports may be opened and closed to position the control ports as desired, thereby controlling the outlet water temperature. A temperature sensor may be coupled to a controller to provide a closed loop feedback system. As a change in temperature is detected, the temperature sensor will alert the controller of the change. The controller will then open the appropriate solenoid valve to move the piston and associated control ports to the proper position to achieve the desired outlet water temperature.

In a further illustrative embodiment of the present disclosure, a diverter valve utilizes hydraulic forces for positioning control ports of the piston to determine which outlet opening receives outlet water. In another illustrative embodiment, a temperature control valve utilizes hydraulic forces for positioning control ports of the piston to determine flow rate of outlet water.

According to an illustrative embodiment of the present disclosure, a water pressure controlled mixing valve includes a mixed water outlet, and a valve housing having a hot water inlet opening, a cold water inlet opening, a hot water outlet opening, and a cold water outlet opening. The hot water outlet opening and the cold water outlet opening are in fluid communication with the mixed water outlet. A piston is slidably received within the housing, the piston including a hot water piston chamber including a hot water inlet port and a hot water outlet port, and a cold water piston chamber including a cold water inlet port and a cold water outlet port. The hot water outlet port is selectively alignable with the hot water outlet opening, and the cold water outlet port is selectively alignable with the cold water outlet opening to control the temperature of water supplied to the mixed water outlet. A first water control chamber is defined by the valve housing, and a first end of the piston is received within the first water control chamber. A second water control chamber is defined by the valve housing, and a second end of the piston is received within the second water control chamber. A first electrically operable valve is fluidly coupled to the first control chamber, and a second electrically operable valve is fluidly coupled to the second control chamber. The first electrically operable valve is configured to control water pressure in the first water control chamber, and the second electrically operable valve is configured to control water pressure in the second water control chamber to cause sliding movement of the piston and control the temperature of water supplied to the mixed water outlet.

According to another illustrative embodiment of the present disclosure, a water pressure controlled valve includes a housing having at least one inlet opening and at least one outlet opening. A piston is slidably received within the housing. A first water control chamber is defined by the housing and receives a first end of the piston, and a second water control chamber is defined by the housing and receives a second end of the piston. A first water control valve is fluidly coupled to the first water control chamber, and a second water control valve is fluidly coupled to the second water control chamber. Operation of the first and second water control valves controls water pressure in the first and second water control chambers to cause sliding movement of the piston and control water flow from the at least one inlet opening to the at least one outlet opening.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 2 is a diagrammatic representation of a first, or full mix, position of the control ports of the mixing valve of FIG. 1;

FIG. 3 is a diagrammatic illustration of a second, or full hot, position of the control ports of the mixing valve of FIG. 1;

FIG. 4 is a diagrammatic representation of a third, or full cold, position of the control ports of the mixing valve of FIG. 1;

FIG. 5 is a diagrammatic representation of a fourth, or cold water volume control, position of the control ports of the mixing valve of FIG. 1;

DETAILED DESCRIPTION OF THE DRAWINGS

The embodiments of the invention described herein are not intended to be exhaustive or to limit the invention to precise forms disclosed. Rather, the embodiments elected for description have been chosen to enable one skilled in the art to practice the invention.

Figure 1:
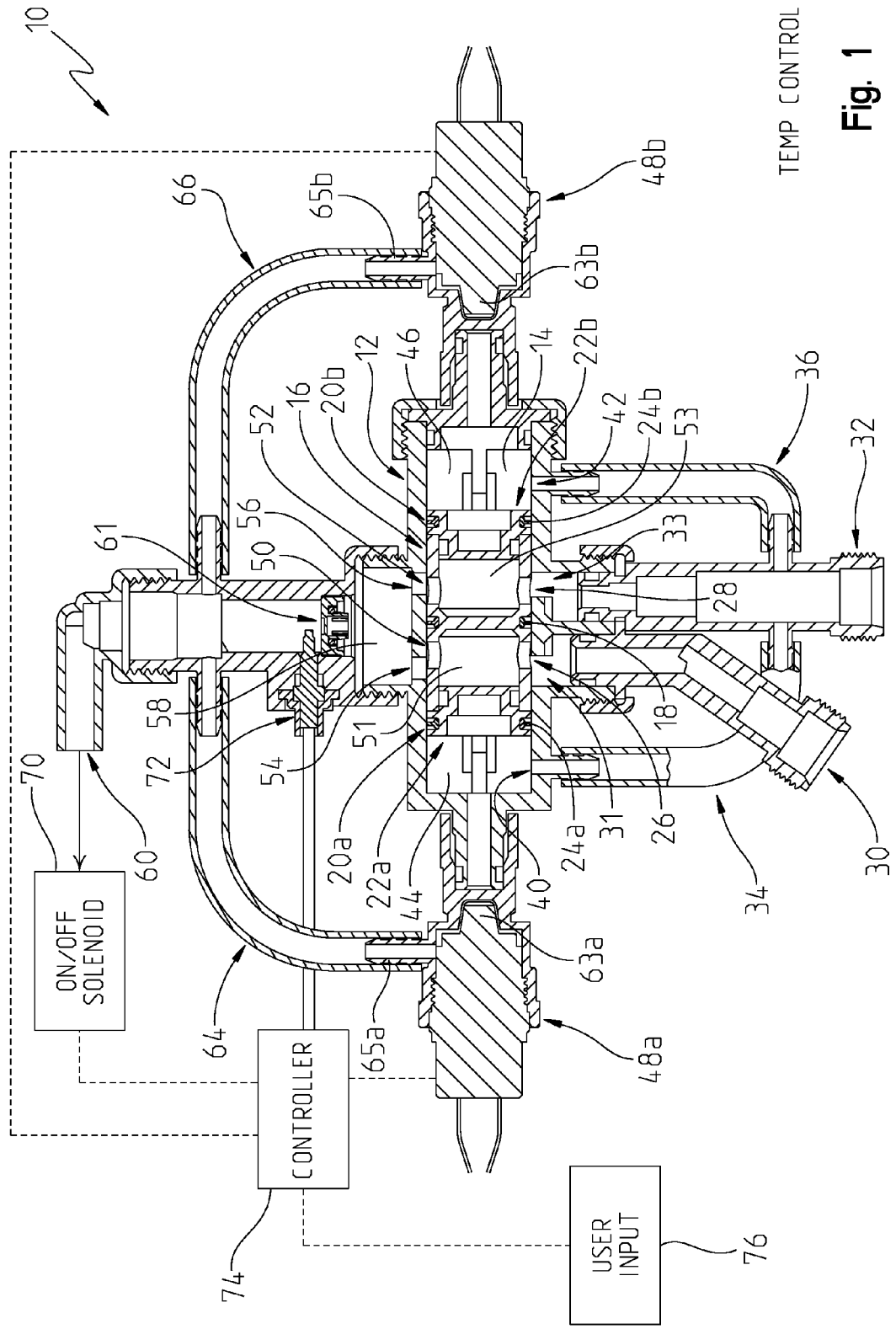
FIG. 1 is a cross-sectional view of an illustrative mixing valve of the present disclosure.

With reference initially to FIG. 1, an illustrative mixing valve 10 according to the present disclosure is shown as including a main valve housing 12 defining a housing bore 14. A piston 16 is slidably received within the housing bore 14. The piston 16 illustratively has a circular cross-section and supports a center seal, illustratively o-ring 18, which provides drag on the piston 16. In the illustrative embodiment, the piston 16 will not move unless there is a load or force applied to it. Opposing ends 20a, 20b of the piston 16 include end caps 22a, 22b and end seals, illustratively o-rings 24a, 24b, assembled into the end caps 22a, 22b. The main valve housing 12 and the piston 16 are dimension such that the clearance channel within the housing bore 14 between the piston 16 and housing 12 is very small (illustratively about 0.002 inches).

Hot and cold water inlet ports 26 and 28 in the piston 16 are in fluid communication with the hot and cold water inlets 30 and 32 through hot and cold water inlet openings 31 and 33, respectively, within the main valve housing 12. The hot and cold water inlets 30 and 32 are in fluid communication with conventional hot and cold water supplies (not shown). Input feeder lines, illustratively tubes 34 and 36, are in fluid communication with the cold water inlet 32 and extend to opposing ends 20a, 20b of the piston 16 (both hot and cold water ends) through control ports 40 and 42, respectively. The feeder lines 34 and 36 are in fluid communication with first and second water control chambers 44 and 46, respectively, formed within the housing 12 at opposing ends 20a and 20b of the piston 16.

Feeder lines 34 and 36 fluidly connect the inlet 32 to the water control chambers 44 and 46, thereby pressurizing both water control chambers 44 and 46 to the same pressure. This results in a static situation where the force acting on each end 20a and 20b of the piston 16 is the same and the piston 16 does not move. Water control valves, illustratively electrically operable valves, such as low flow solenoid valves 48a and 48b, are mounted in series with the feeder lines 34 and 36 and control water pressure going to the control chambers 44 and 46 on opposing ends 20a and 20b of the piston 16.

In the illustrative embodiment shown in FIGS. 1-5, the piston 16 includes hot and cold water outlet ports 50 and 52 in communication with hot and cold water inlet ports 26 and 28 through internal hot and cold water piston chambers 51 and 53, respectively. The hot and cold water outlet ports 50 and 52 of the piston 16 are configured to be aligned with hot and cold water outlet openings 54 and 56 within the main valve housing 12. The hot and cold water outlet openings 54 and 56 are in fluid communication with an outlet mixing chamber 58 which, in turn, is in fluid communication with a mixed water outlet 60. The mixed water outlet 60 may be coupled to a downstream faucet. A flow control device or regulator 61 is illustratively positioned intermediate the outlet mixing chamber 58 and the mixed water outlet 60. The center seal 18 provides drag on the piston 16 allowing the piston 16 to remain in the desired position and prevents cross flow of the hot water (from the hot water piston chamber 51) and cold water (from the cold water piston chamber 53). The end caps 22a, 22b and seals 24a, 24b seal the opposing ends 20a and 22b of the control piston 16, which isolates the inlet water (through water inlet openings 31 and 33) from the control water (within the water control chambers 44 and 46).

In the illustrative embodiment, the hot and cold water outlet ports 50 and 52 of the piston 16 are roughly triangular shaped openings that may be selectively aligned with circular outlet openings 54 and 56 of the valve housing 12. FIGS. 1 and 2 show the piston 16 in the full mix position, providing substantially equal flows of the hot and cold water. More particularly, the overlap 62a between the hot water port 50 and the hot water outlet opening 54 is substantially equal to the overlap 62b between the cold water port 52 and the cold water outlet opening 56. FIG. 3 shows the piston 16 shuttled to the full hot position (moved to the left from the position in FIG. 1). In this position, there is complete overlap 62a between the hot water port 50 and the hot water outlet opening 54, and no overlap between the cold water port 52 and the cold water outlet opening 56. FIG. 4 shows the piston 16 shuttled to the full cold position (moved to the right from the position in FIG. 1). In this position, there is complete overlap 62b between the cold water port 52 and the cold water outlet opening 56, and no overlap between the hot water port 50 and the hot water outlet opening 54. Extra travel can be built into the piston 16 traveling in the cold water direction to control the volume of the cold water as illustrated by FIG. 5.

In operation, hot and cold water enter hot and cold water inlets 30 and 32, pass through the hot and cold water inlet ports 26 and 28 in the piston 16, through the hot and cold water piston chambers 51 and 53, and then up through roughly triangular shaped hot and cold water outlet ports 50 and 52 in the upper part of the piston 16. The alignment of the triangular shaped hot and cold water outlet ports 50 and 52 in the piston 16 with the upper outlet openings 54 and 56 in the main valve housing 12 control the respective flows of hot and cold water to the outlet mixing chamber 58 and the outlet 60. This structure can be easily sized to provide small or large flow rates.

Electrically operable valves, illustratively low flow solenoid valves 48a and 48b, are operably coupled to the main valve housing 12 at control chambers 44 and 46, respectively. Solenoids 48a and 48b are illustratively normally closed solenoid valves. Output feeder or vent lines 64 and 66, illustratively tubes, fluidly couple the outlets 65a and 65b of the solenoid valves 48a and 48b, respectively, to a point above the flow control device 61. A pressure differential exists between the piston 16 and the exit of the output feeder lines 64 and 66.

Energizing solenoid valve 48a opens a valve member 63a, thereby venting off water pressure in control chamber 44 supplied by the feeder line 34. More particularly, water is vented through solenoid outlet 65a through the feeder line 64 and to the mixed water outlet 60. The reduction in pressure within the control chamber 44 allows the water pressure in control chamber 46 to push the piston 16 to the left from the full mix position shown in FIGS. 1 and 2, thereby gradually opening up the hot water outlet port 50 and closing the cold water outlet port 52. Continued reduction in pressure within the control chamber 44 will cause the piston 16 to move eventually to the full hot position of FIG. 3. When solenoid valve 48a is closed, pressure is restored to chamber 44 though the feeder line 34 and the piston 16 stops moving.

Similarly, energizing solenoid valve 48b controls the temperature of the water in the cold direction. More particularly, energizing solenoid valve 48b opens a valve member 63b, thereby venting off water pressure in chamber 46 supplied by the feeder line 36. More particularly, water is vented through solenoid outlet 65b through the feeder line 66 and to the mixed water outlet 60. The reduction in pressure within the control chamber 46 allows the water pressure in control chamber 44 to push the piston 16 to the right from the full mix position as shown in FIGS. 1 and 2, thereby gradually opening up the cold water outlet port 52 and closing the hot water outlet port 50. Continued reduction in pressure within the control chamber 46 will cause the piston 16 to move eventually to the full cold position of FIG. 4. By operating the solenoid valves 48a and 48b in the manner detailed above, temperature of the outlet water may be controlled. When solenoid valve 48b is closed, pressure is restored to chamber 46 though the feeder line 36 and the piston 16 stops moving.

A flow control solenoid valve 70 may be fluidly coupled to the mixed water outlet 60 for tuning on and off water flow through the faucet at a selected temperature. A temperature sensor, such as a thermistor 72, illustratively provides outlet water temperature feedback to a controller 74, thereby defining a closed loop system. In the illustrative embodiment, the thermistor 72 is in thermal in thermal communication with outlet water passing through the outlet mixing chamber 58 to the mixed water outlet 60. The controller 74 may also be in communication with a user input 76 and the solenoid valves 48a, 48b and 70. A user may input a selected or setpoint temperature to the controller 74 through the user input 76, such as a handle, a dial, or a keypad. In response to input from the user input 76 and the thermistor 72, the controller 74 operates the solenoid valves 48a and 48b to control temperature, and operates the solenoid valve 70 to turn on and off water flow. More particularly, the controller 74 may operate the solenoid valves 48a and 48b to control the position of the piston 16 and maintain the outlet water temperature (as detected by the thermistor 72) at the setpoint temperature (from the user input 76). The closed loop system defined by the controller 74 and the thermistor 72 may also provide scald protection by setting a maximum outlet water temperature.

A position sensor (not shown) may be operably coupled to the control piston 16 to determine the position of the piston 16 relative to the valve housing 12. The position sensor will improve responsiveness of the system by causing the controller 74 to send the piston 16 to a calculated position initially with fine tuning adjustments as necessary. Without feedback from the position sensor, the controller 74 will illustratively move the control piston 16 in steps until the desired temperature is reached.

In a further illustrative embodiment, a plate that translates in a linear or radial manner may be configured to accomplish a similar function as the piston 16. A pressure balance stage may also be added to the system to provide anti-scald protection if desired.

FIGS. 6-16 illustrate a mixing valve 110 improved for manufacturability. In the following description, similar components to those identified above with mixing valve 10 are identified with like reference numbers.

The illustrative design includes a base 112, a valve housing 114, a retention cap 116, an outlet housing 118, and a pair of cross-linked polyethylene (PEX) tubes 120 and 122 connecting the vent chambers 124 and 126 to mixed water outlet 128. The base 112 includes a hot water inlet 130, and a cold water inlet 132. Check valves (not shown) are illustratively inserted into each of the hot and cold water outlet openings 134 and 136 of the housing 114. The outlet housing 118 and retention cap 116 are shown being connected with a bayonet connection 140 and screws 142, respectively. Other types of connection means, such as spin or sonic welding at attachment points 144 and 146, may be substituted therefor. Thermistor 72 may be assembled into the outlet housing 118 at receiving bore 148.

Figure 6:
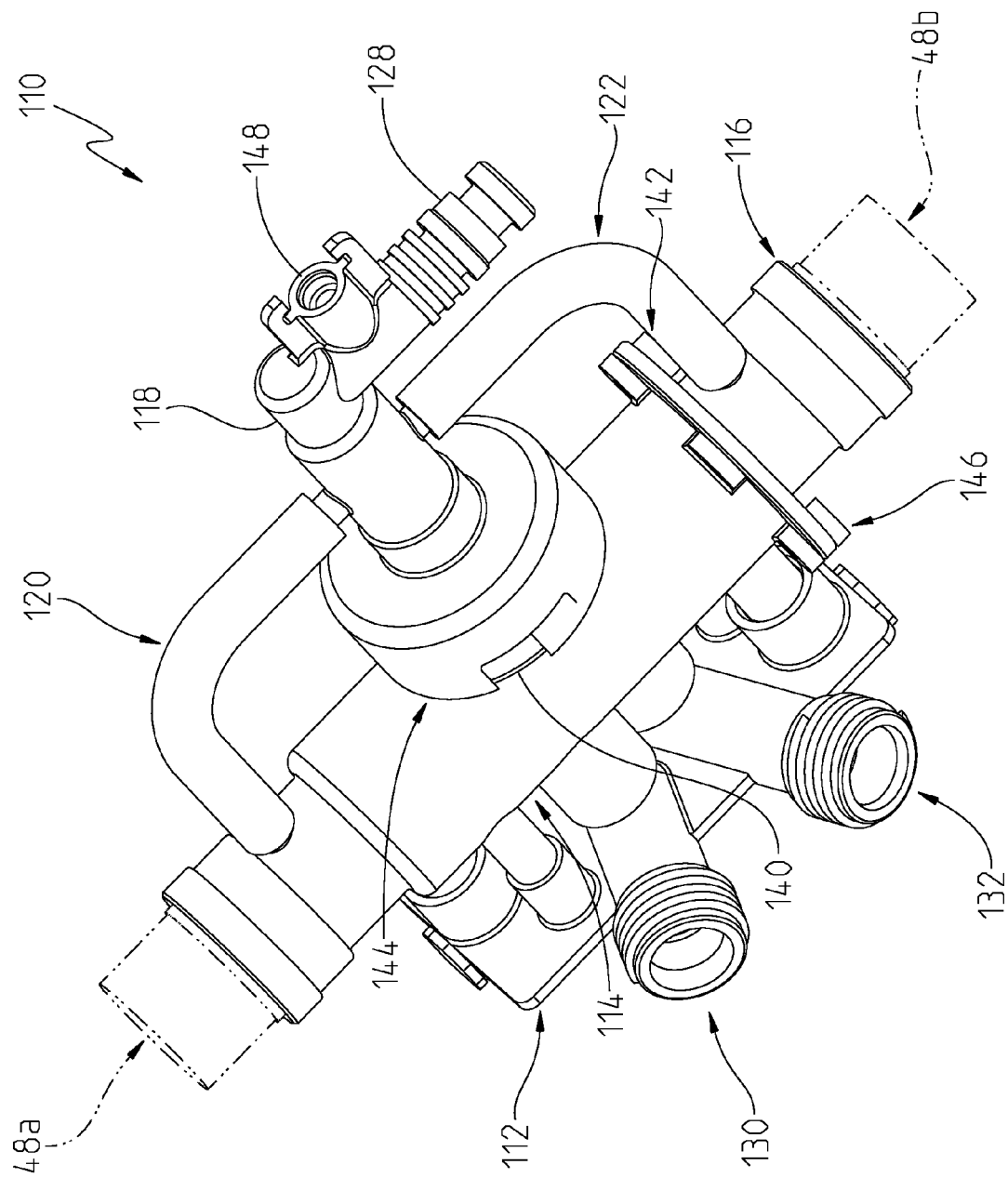
FIG. 6 is a perspective view of another illustrative mixing valve of the present disclosure.
Figure 7:
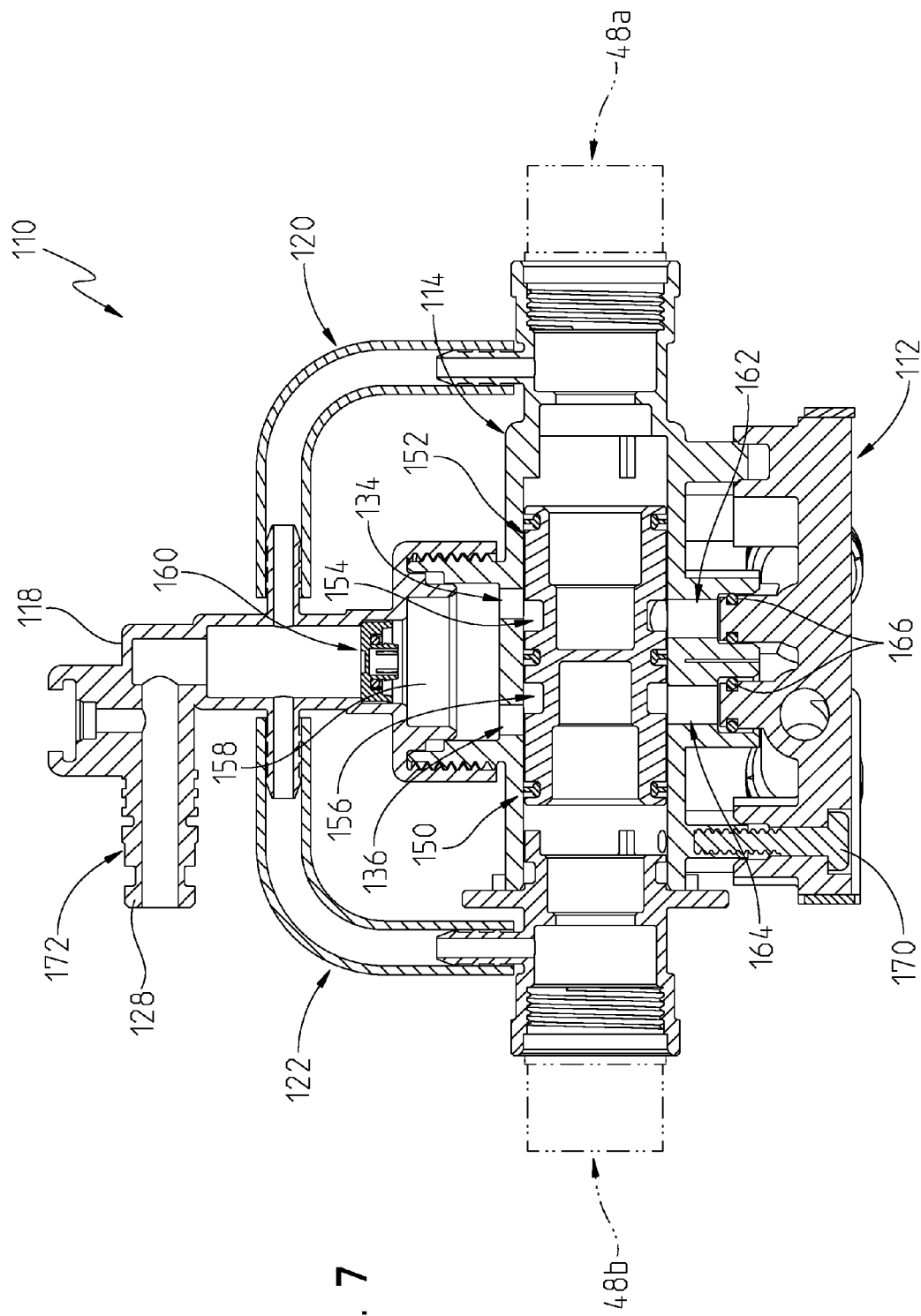
FIG. 7 is a cross-sectional view of the mixing valve of FIG. 6.
Figure 8:
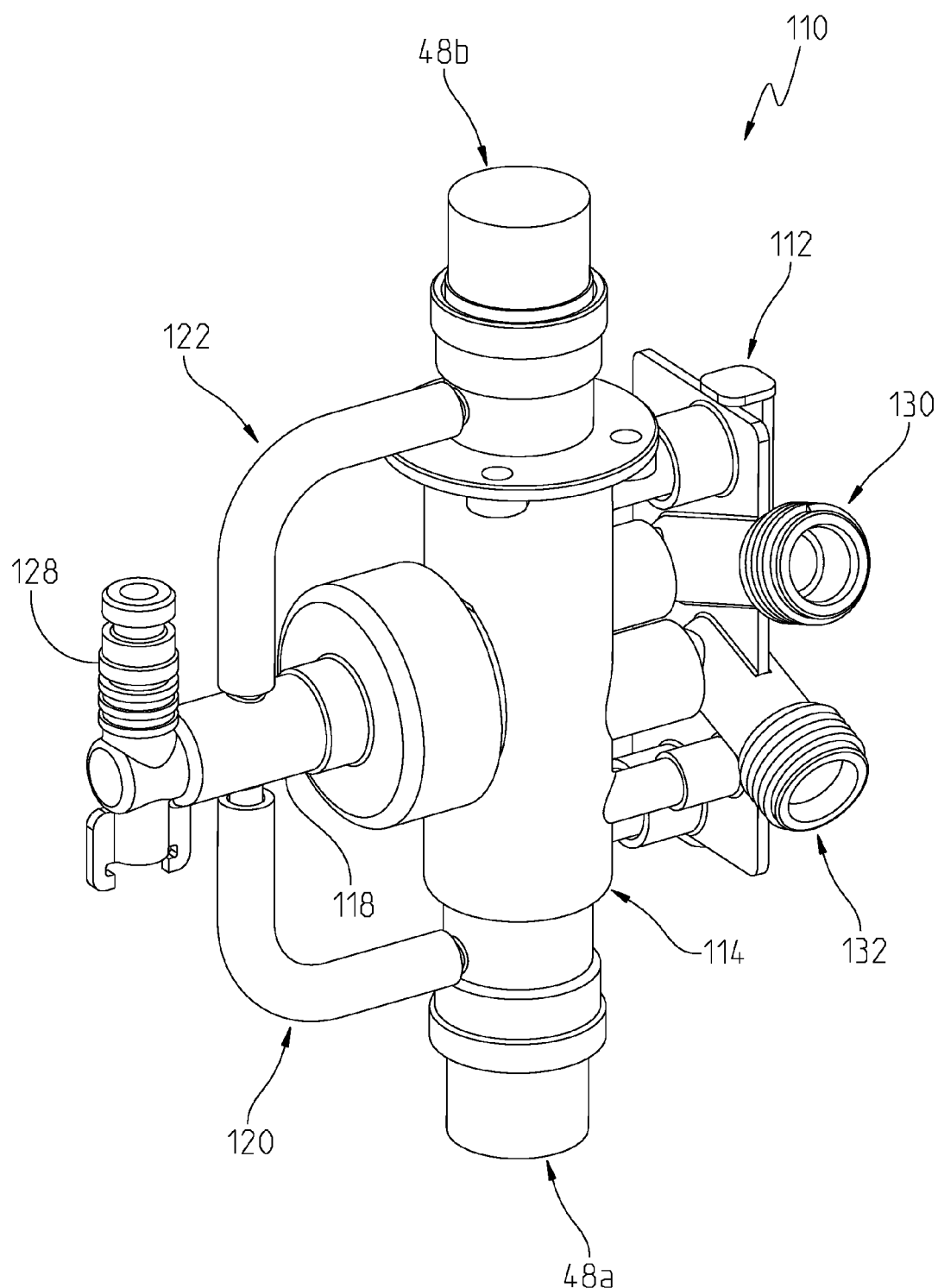
FIG. 8 is a front perspective view of a mixing valve of the present disclosure.
Figure 9:
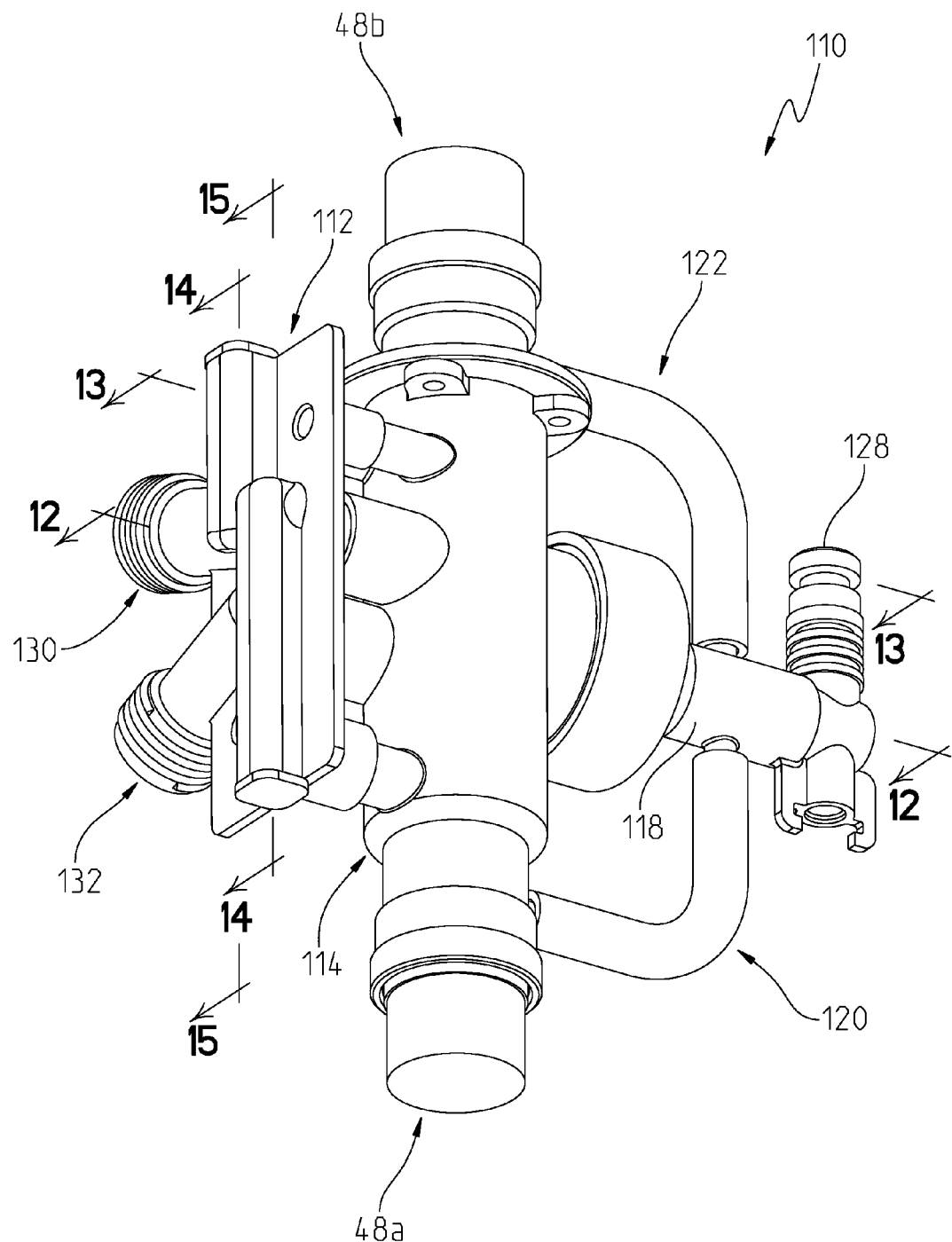
FIG. 9 is a rear perspective view of the mixing valve of FIG. 8.
Figure 10:
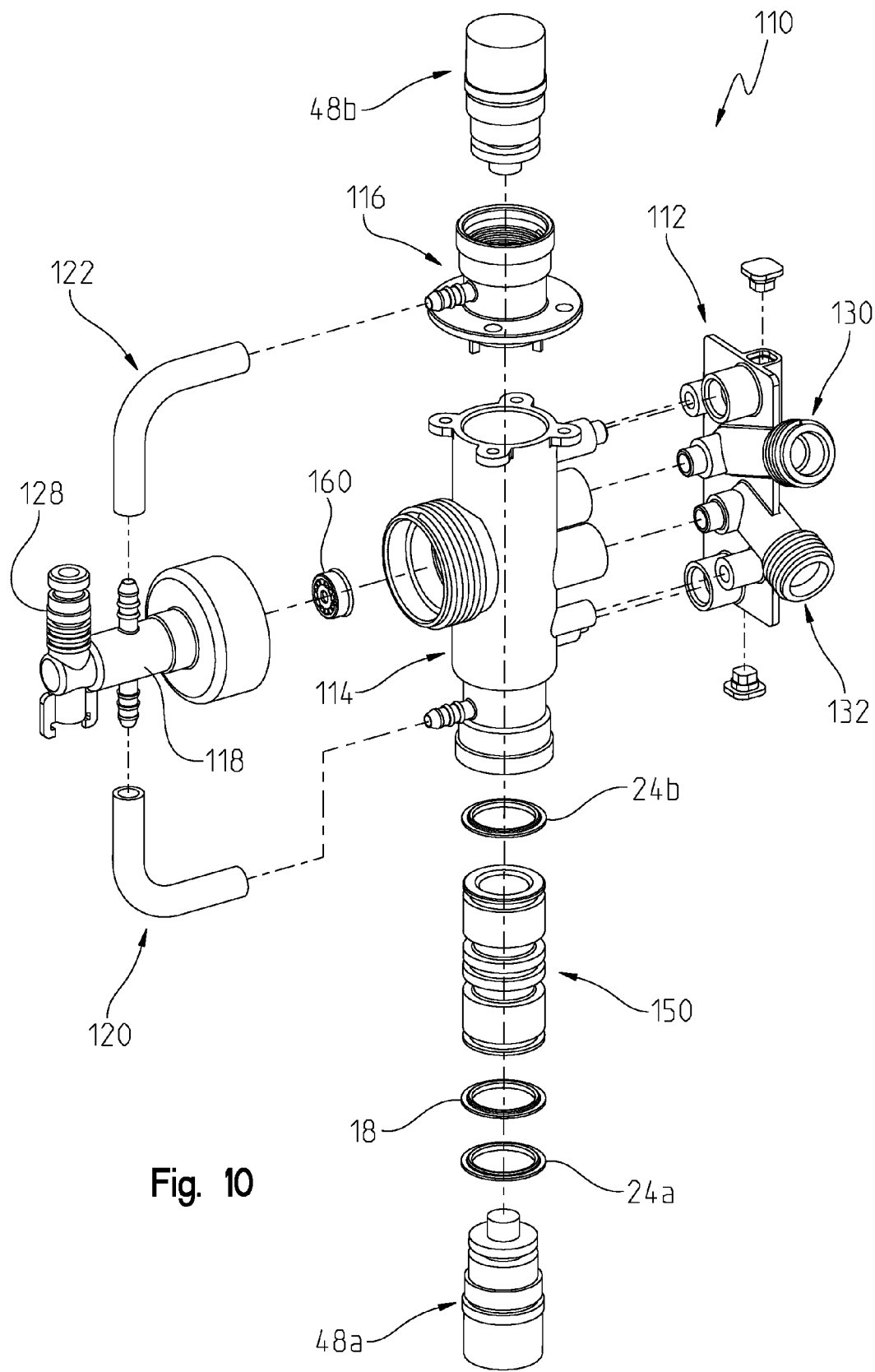
FIG. 10 is a front exploded perspective view of the mixing valve of FIG. 8.
Figure 11:
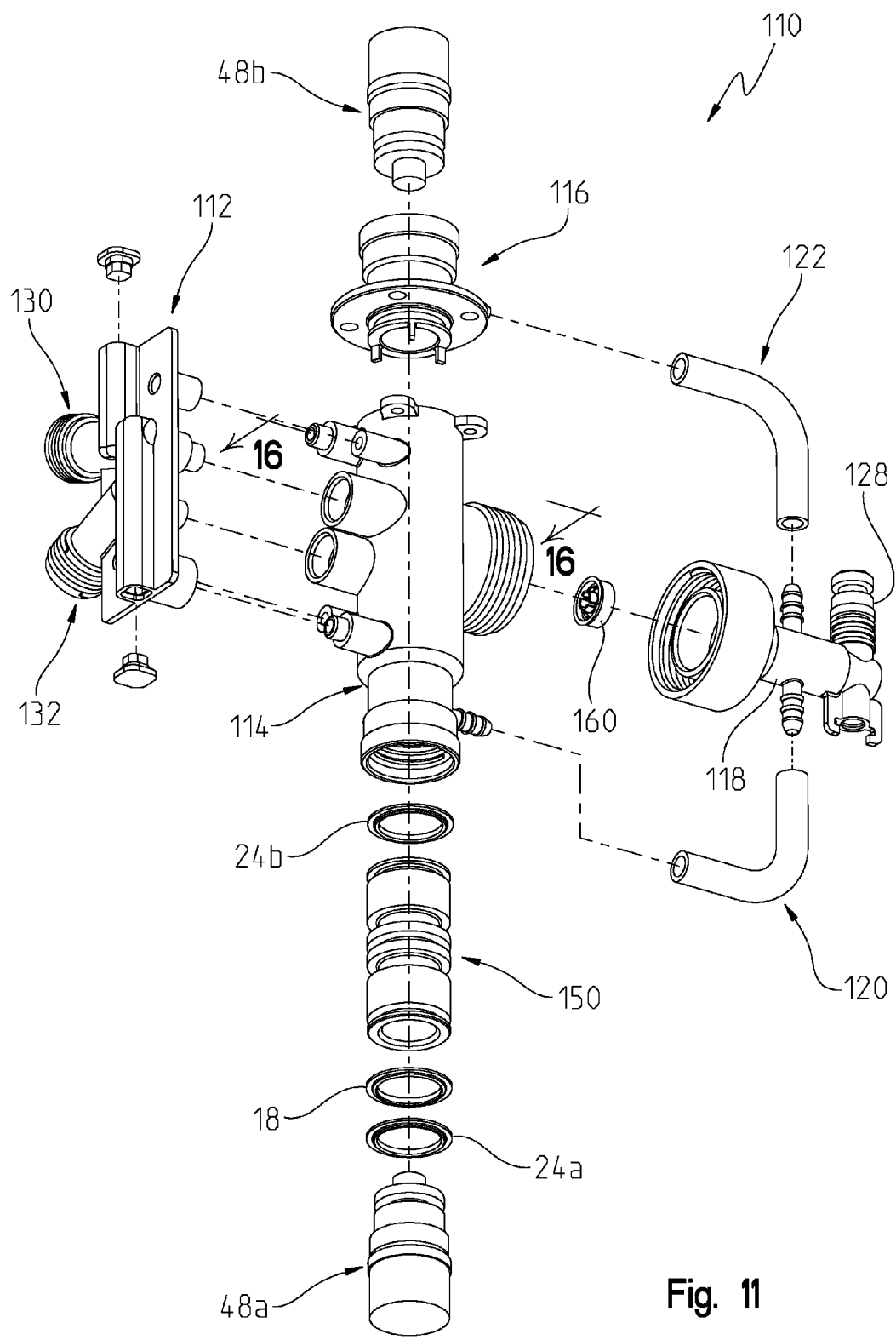
FIG. 11 is a rear exploded perspective view of the mixing valve of FIG. 8.
Figure 12:
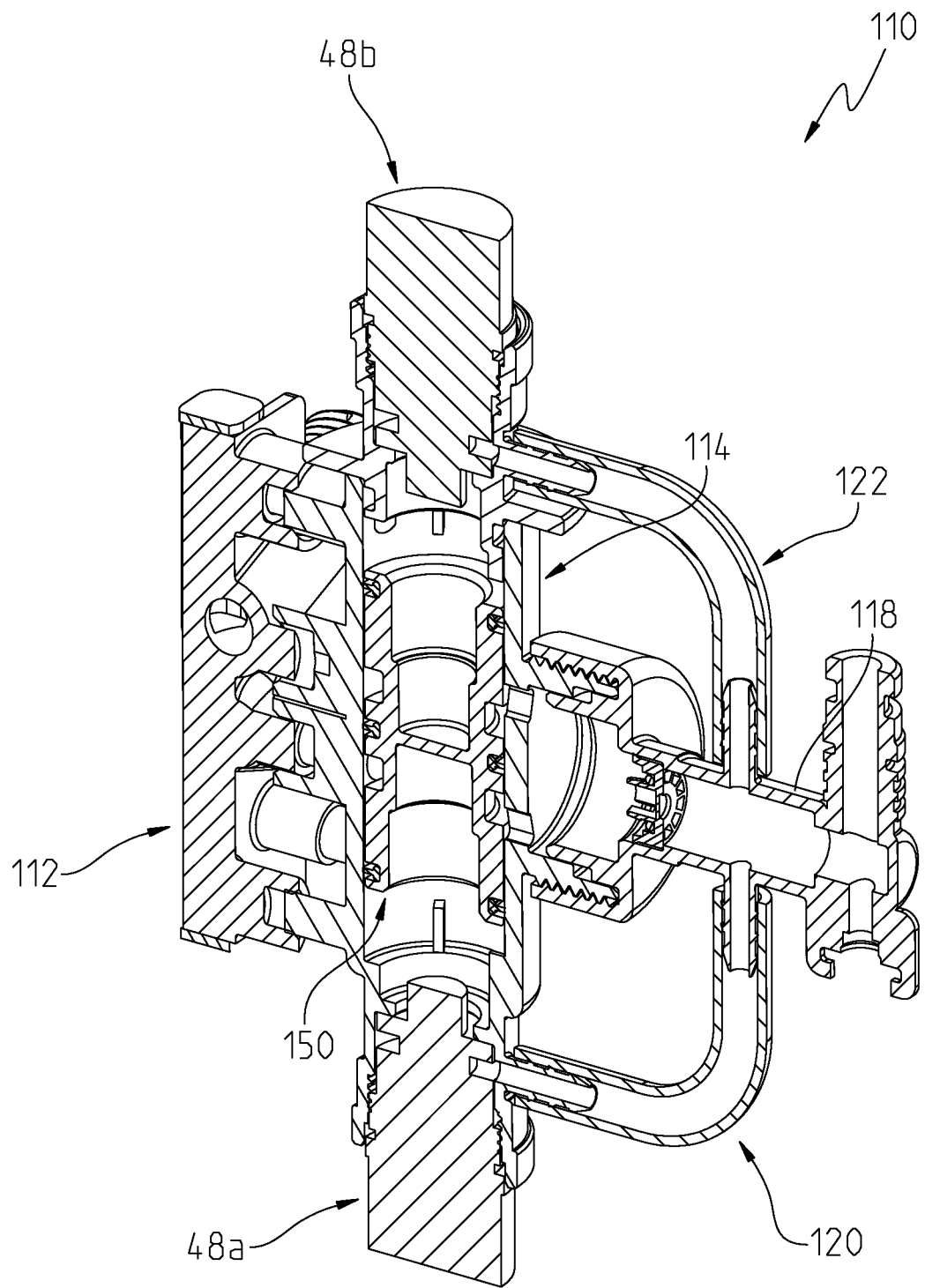
FIG. 12 is a cross-sectional view taken along line 12-12 of FIG. 9.
Figure 13:
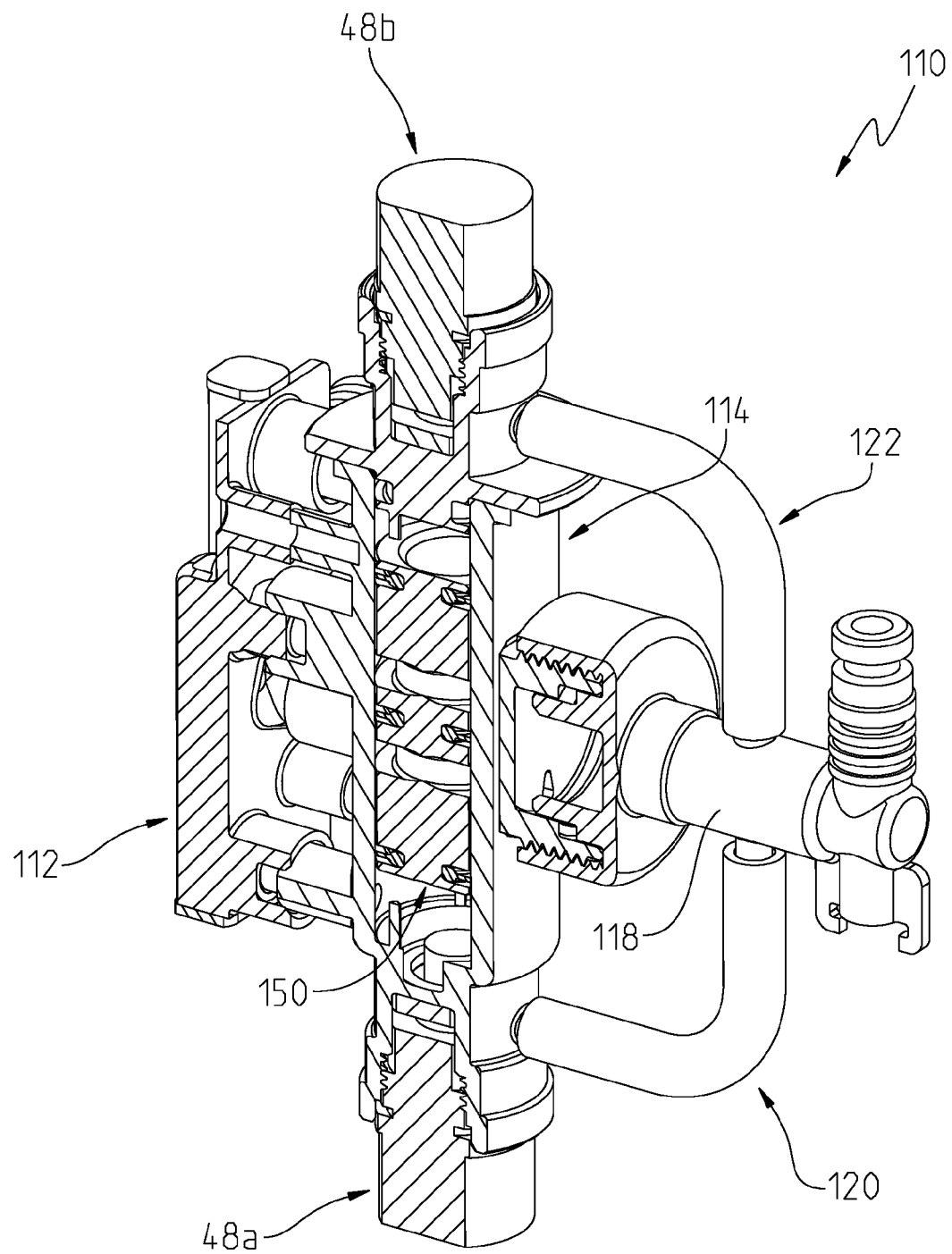
FIG. 13 is a cross-sectional view taken along line 13-13 of FIG. 9.
Figure 14:
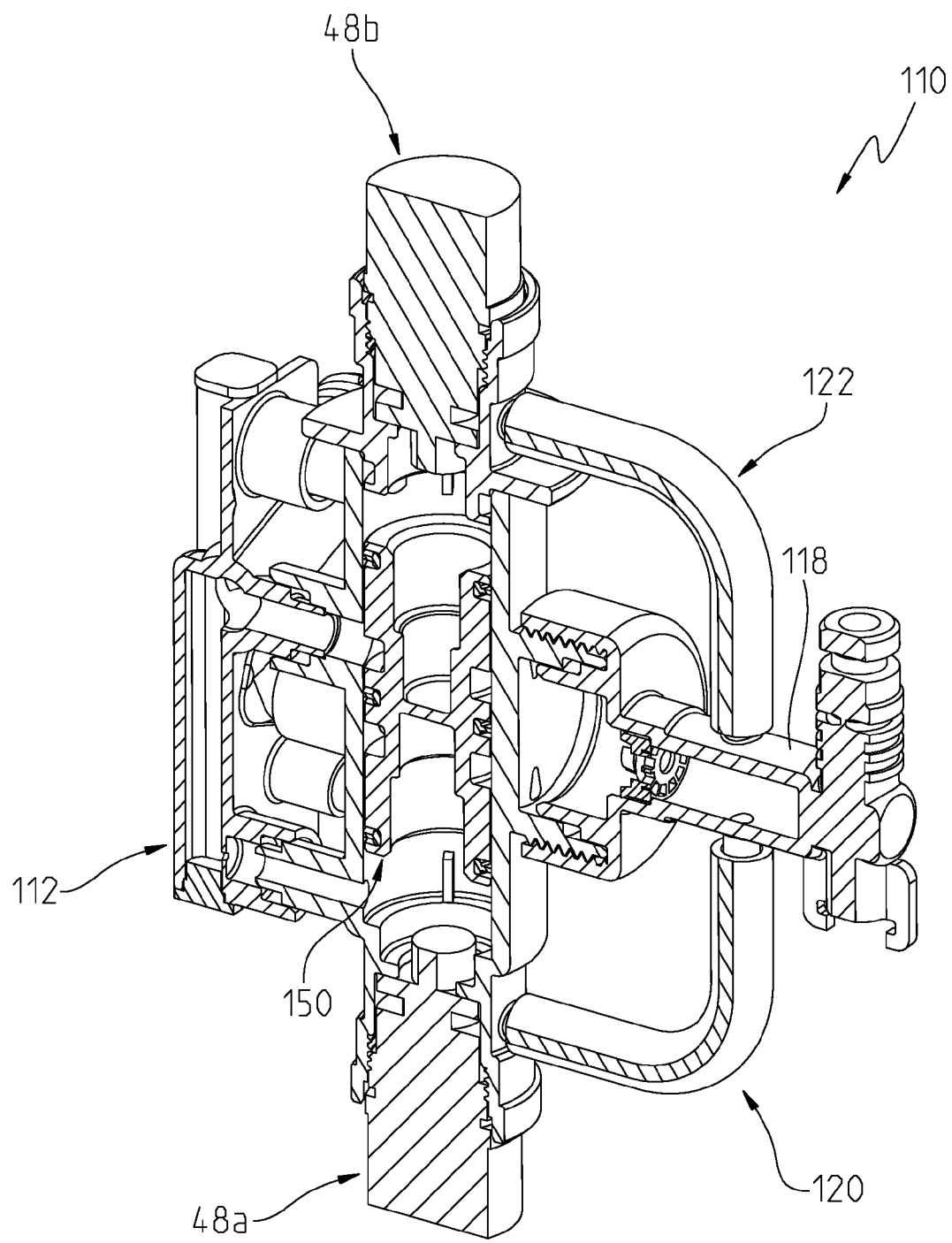
FIG. 14 is a cross-sectional view taken along line 14-14 of FIG. 9.
Figure 15:
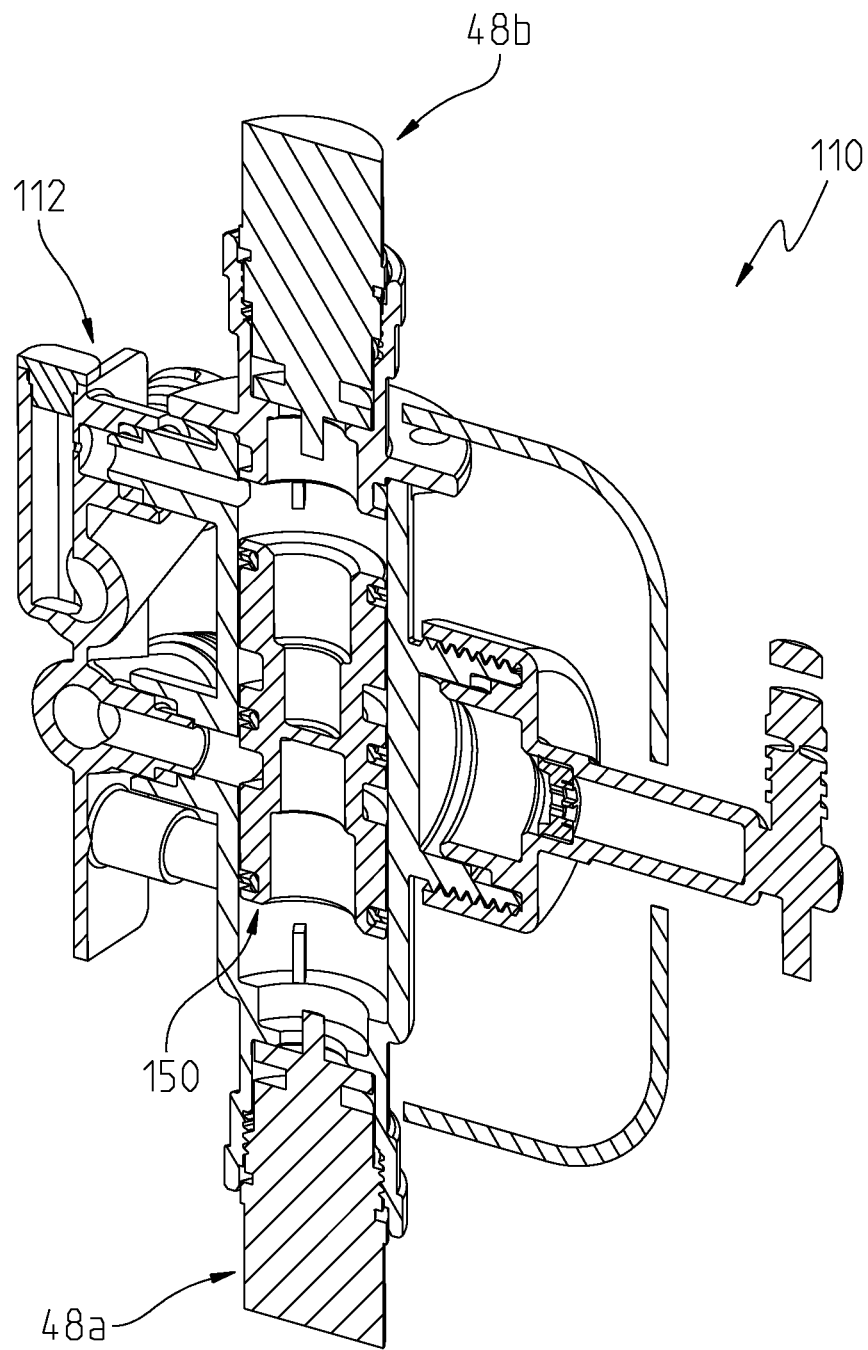
FIG. 15 is a cross-sectional view taken along line 15-15 of FIG. 9.
Figure 16:
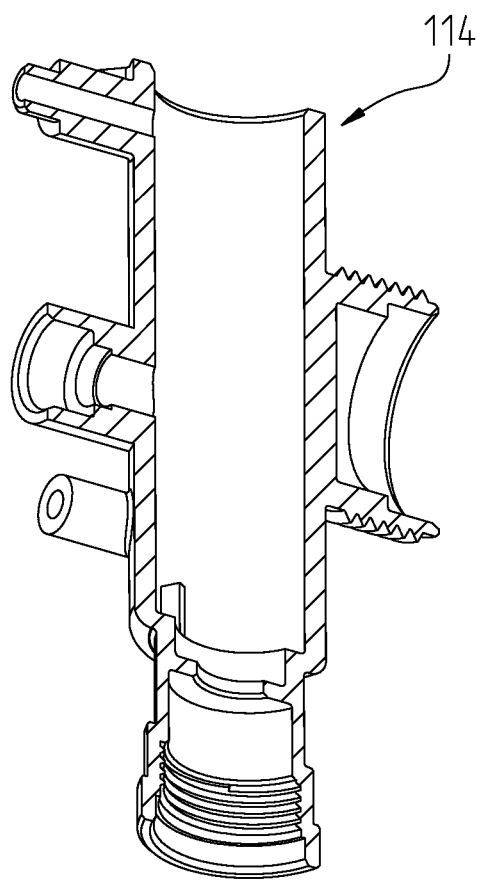
FIG. 16 is a cross-sectional view taken along line 16-16 of FIG. 11.

The embodiment as shown in FIGS. 6 and 7 reduces the number of parts and provides for a more robust manufacturable design. Internally, the design of the piston 150 is modified to reduce the number of parts and limit required assembly operations. Referring to FIG. 7, a one piece spool 152 has replaced the three piece spool assembly of FIG. 1. Control edges of hot and cold water outlet ports 154 and 156 on the piston 150 engage with hot and cold water outlet openings 134 and 136 in the valve housing 12 as detailed above to control the amount of hot and cold water entering the mixing chamber 158. A flow control device 160 is located below the PEX connection tubes 120 and 122. It is desired that most of the pressure drop in the system be located below the PEX tube connection points.

Solenoids valves 48a and 48b are provided as noted above in the previous embodiments to control motion of the piston 150. Hot water enters into the piston chamber through opening 162, while cold water enters into the piston chamber through opening 164. Sealing between the base 112 and valve housing 114 is accomplished with seals, such as o-rings 166. In this embodiment, the entire assembly is held together with screws 170 extending through the base 112 and threading into the valve housing 114. A latching type solenoid (not shown) may be assembled onto a coupling extension 172 of the outlet housing 118 to control the on/off function of the valve 110.

Figure 17:
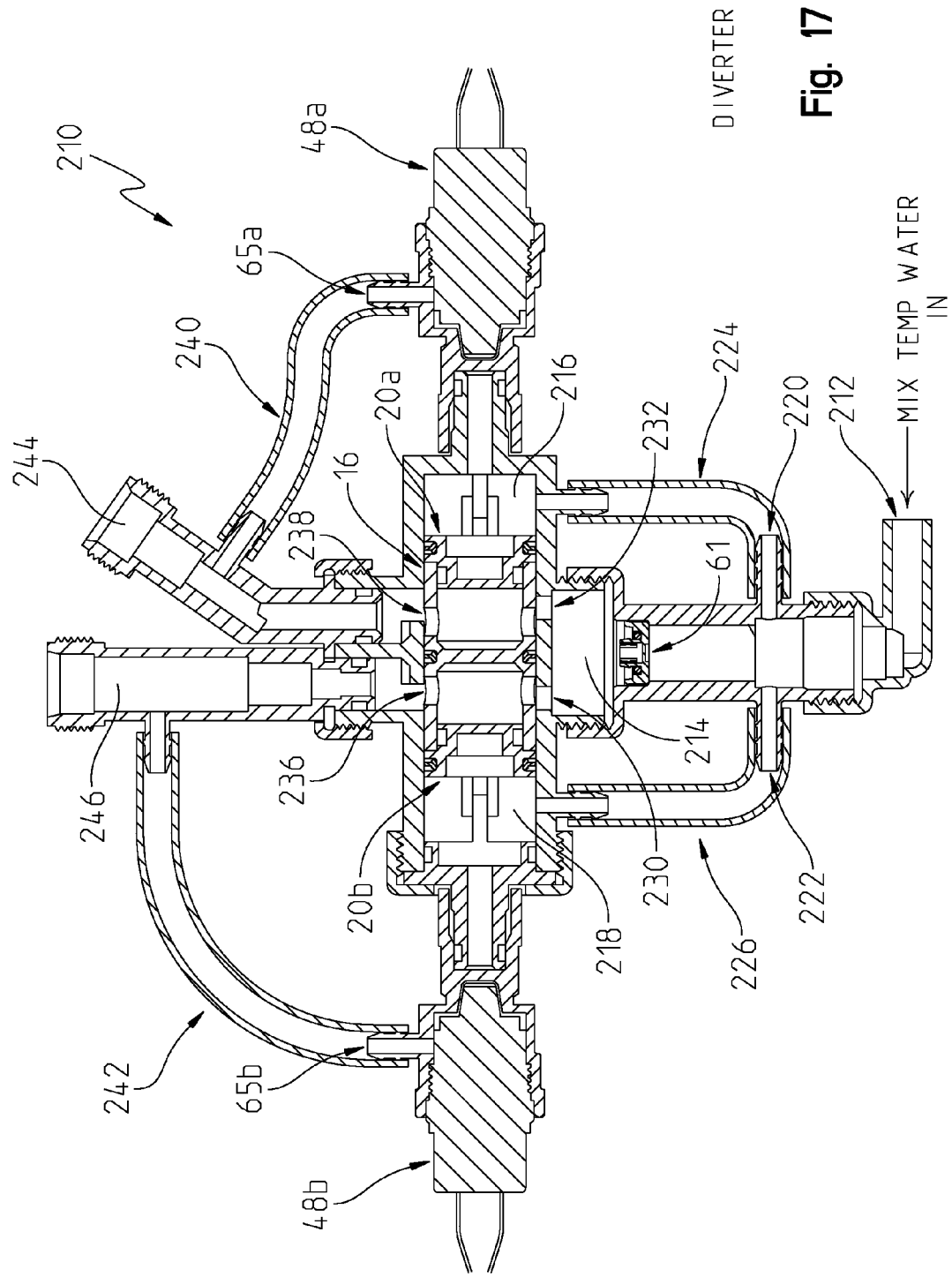
FIG. 17 is a cross-sectional view of an illustrative diverter valve of the present disclosure.

A further illustrative embodiment is shown in FIG. 17, where the orientation of the mixing valve 10 of FIG. 1 is reversed, allowing it to act as a diverter valve 210. In the following description, similar components to those identified above with mixing valve 10 are identified with like reference numbers.

With further reference to FIG. 17, tempered or mixed water enters the diverter valve 210 at the inlet 212, floods inlet chamber 214 and provides input to hot water control chamber 216 and cold water control chamber 218 through inlet ports 220 and 222, respectively. Inlet feeder lines 224 and 226 connect the inlet ports 220 and 222 to the control chambers 216 and 218, respectively, thereby pressurizing both chambers 216 and 218 to the same pressure. This results in a static situation where the force acting on opposing ends 20a and 20b of the piston 16 is the same so the piston 16 does not move.

Inlet chamber 214 has an outlet 230 for the left hand port and an outlet 232 for the right hand port. Illustratively, the outlets 230 and 232 may be of similar design as the outlet openings 54 and 56 detailed above. Water illustratively passes through the outlets 230 and 232 through the piston 16 and into either port 236 and 238. Illustratively, the ports 236 and 238 may be of similar design as the ports 26 and 28 detailed above. As shown in FIG. 17, both ports 236 and 238 are open. As noted in the previous embodiment, normally closed solenoid valves 48a and 48b are connected in series between the hot and cold water control chambers 216 and 218 through the solenoid outlets 65a and 65b, through the outlet feeder lines 240 and 242 and into the desired outlet ports 244 and 246.

Opening solenoid 48a will vent off the pressure from control chamber 216 allowing the higher pressure from control chamber 218 to move the piston 16 to the right from the position of FIG. 17, closing off outlet 230 and opening up outlet 232. In this manner, the diverter valve 210 can control on and off for both outlet ports 244 and 246, and can also inversely control the relative amount of water going through each outlet port 244 and 246, if desired. Flow control device 61 limits the flow rate of the diverter valve 210. This location allows the control chambers 216 and 218 to be under higher pressure than the outlet, which will improve the performance of the device 210.

Figure 18:
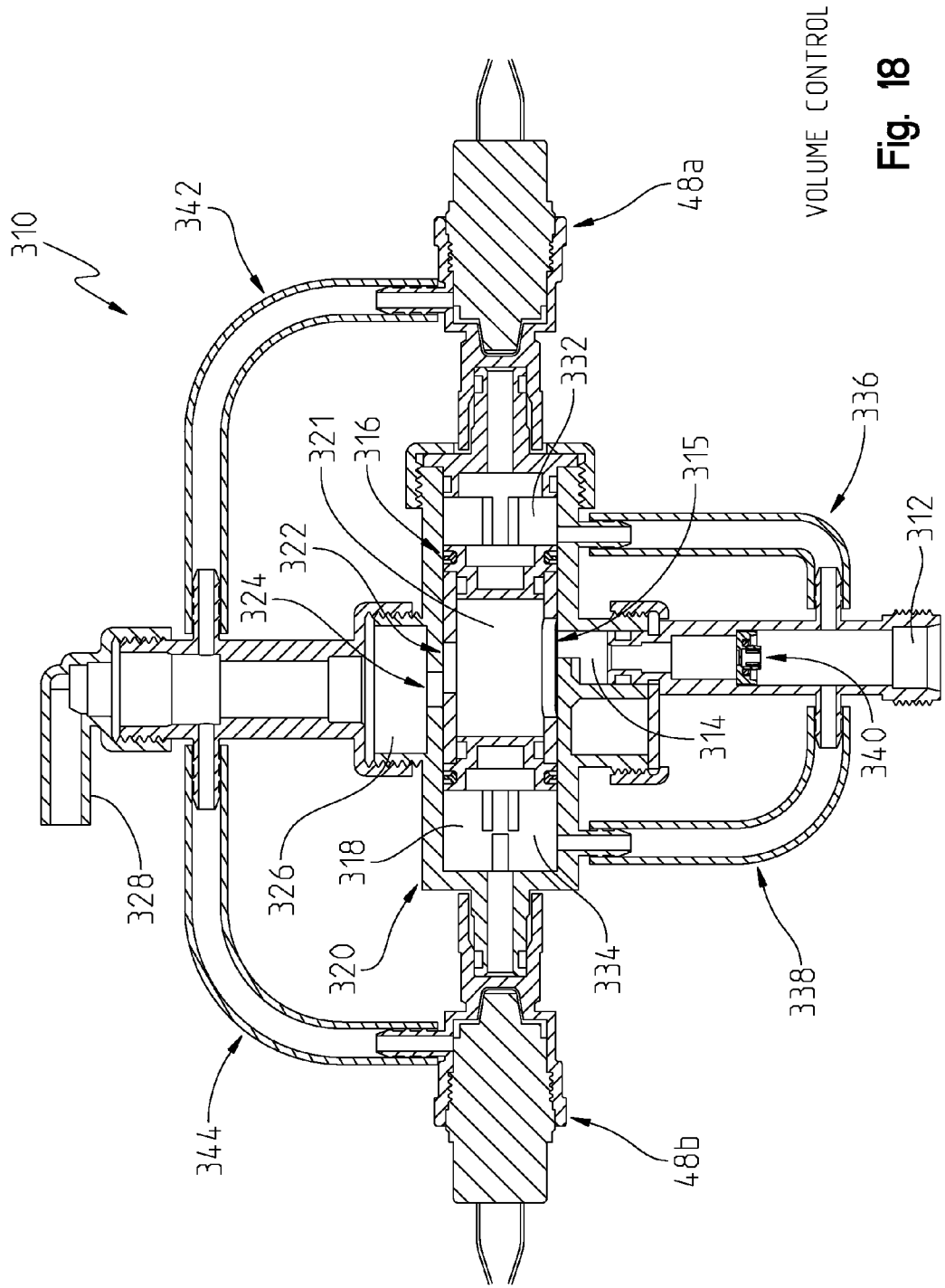
FIG. 18 is a cross-sectional view of an illustrative volume control valve of the present disclosure.

Another illustrative embodiment is shown in FIG. 18, where the mixing valve 10 is converted to a volume control valve 310. In the following description, similar components to those identified above with mixing valve 10 are identified with like reference numbers.

With reference to FIG. 18, the volume control valve 310 includes an inlet 312 in fluid communication with an inlet chamber 314 and a housing outlet 315. As in prior embodiments, a piston 316 is slidably received within a bore 318 of a valve housing 320. The inlet chamber 314 is in fluid communication with an opening in valve housing 320. Water passes through a chamber 321 of the piston 316 to a piston outlet port 322. The piston outlet port 322 may selectively align with body outlet port 324 which connects to an outlet chamber 326. Outlet chamber 326 is fluidly coupled to an outlet 328.

The piston outlet port 322 may be configured to easily control the flow rate entering the outlet chamber 326 as the piston 316 moves back and forth. Water control chambers 332 and 334 are in fluid communication with the inlet feeder lines 336 and 338. A flow control or restrictor 340 controls the maximum flow rate of the device 310 while allowing control chambers 332 and 334 have higher pressures than the internal piston chamber 321 and downstream areas, which will improve performance.

As further detailed herein, the piston 316 may be moved as a result of pressure differential between the control chambers 332 and 334, as water is vented from the valves 48a and 48b through feeder lines 342 and 344 to the outlet 328.

Although the invention has been described in detail with reference to certain preferred embodiments, variations and modifications exist within the spirit and scope of the invention as described and defined in the following claims.

The invention claimed is:

1. A water pressure controlled mixing valve comprising:
    a mixed water outlet;
    a valve housing including a hot water inlet opening, a cold water inlet opening, a hot water outlet opening, and a cold water outlet opening, the hot water outlet opening and the cold water outlet opening in fluid communication with the mixed water outlet;
    a piston slidably received within the housing, the piston including a hot water piston chamber including a hot water inlet port and a hot water outlet port, and a cold water piston chamber including a cold water inlet port and a cold water outlet port, the hot water outlet port selectively alignable with the hot water outlet opening, and the cold water outlet port selectively alignable with the cold water outlet opening to control the temperature of water supplied to the mixed water outlet;
    a center seal supported by the piston and sealing the hot water piston chamber from the cold water piston chamber;
    first and second end seals supported by the piston, the first end seal sealing the first control chamber from the hot water piston chamber, and the second end seal sealing the second control chamber from the cold water piston chamber;
    a first water control chamber defined by the valve housing, a first end of the piston received within the first water control chamber;
    a second water control chamber defined by the valve housing, a second end of the piston received within the second water control chamber;
    a first electrically operable valve fluidly coupled to the first water control chamber;
    a second electrically operable valve fluidly coupled to the second water control chamber;
    a first feeder line providing fluid communication between the cold water inlet opening and the first control chamber;
    a second feeder line providing fluid communication between the cold water inlet opening and the second control chamber;
    a first vent line providing fluid communication between the first control chamber and the mixed water outlet through the first electrically operable valve;
    a second vent line providing fluid communication between the second control chamber and the mixed water outlet through the second electrically operable valve; and
    wherein the first electrically operable valve is configured to control water pressure in the first water control chamber, and the second electrically operable valve is configured to control water pressure in the second water control chamber, such that a pressure differential between the first water control chamber and the second water control chamber causes sliding movement of the piston to control the temperature of water supplied to the mixed water outlet.

2. The mixing valve of claim 1, further comprising a controller configured to control operation of the first electrically operable valve and the second electrically operable valve.

3. The mixing valve of claim 2, further comprising a temperature sensor in communication with the controller and configured to detect the temperature of water at the mixed water outlet.

4. The mixing valve of claim 1, further comprising a flow control electrically operable valve fluidly coupled to the mixed water outlet.

5. A water pressure controlled valve comprising:
    a housing including a hot water inlet opening, a cold water inlet opening, a hot water outlet opening, and a cold water outlet opening, the hot water outlet opening and the cold water outlet opening in fluid communication with a mixed water outlet;
    a piston slidably received within the housing;
    a first water control chamber defined by the housing and receiving a first end of the piston;

a second water control chamber defined by the housing and receiving a second end of the piston;
a first water control valve fluidly coupled to the first water control chamber;
a second water control valve fluidly coupled to the second water control chamber;
first and second end seals supported by the piston, the first end seal sealing the first control chamber from the hot water inlet opening, and the second end seal sealing the second control chamber from the cold water inlet opening;
a first feeder line providing fluid communication between the cold water inlet opening and the first control chamber;
a second feeder line providing fluid communication between the cold water inlet opening and the second control chamber;
a first vent line providing fluid communication between the first control chamber and the mixed water outlet through the first electrically operable valve;
a second vent line providing fluid communication between the second control chamber and the mixed water outlet through the second electrically operable valve; and
wherein operation of the first and second water control valves controls water pressure in the first and second water control chambers to cause sliding movement of the piston and control water flow from the at least one inlet opening to the at least one outlet opening.

6. The water pressure controlled valve of claim 5, wherein:

the housing includes a hot water inlet opening, a cold water inlet opening, a hot water outlet opening, and a cold water outlet opening, the hot water outlet opening and the cold water outlet opening in fluid communication with a mixed water outlet;
the piston includes a hot water piston chamber including a hot water inlet port and a hot water outlet port, and a cold water piston chamber including a cold water inlet port and a cold water outlet port, the hot water outlet port selectively alignable with the hot water outlet opening, and the cold water outlet port selectively alignable with the cold water outlet opening to control the temperature of water supplied to the mixed water outlet.

7. The water pressure controlled valve of claim 6, wherein the first water control valve comprises a first electrically operable valve, and the second water control valve comprises a second electrically operable valve.

8. The water pressure controlled valve of claim 7, further comprising a controller configured to control operation of the first electrically operable valve and the second electrically operable valve.

9. The water pressure controlled valve of claim 8, further comprising a temperature sensor in communication with the controller and configured to detect the temperature of water at the mixed water outlet.

10. The water pressure controlled valve of claim 6, further comprising a center seal supported by the piston and sealing the hot water piston chamber from the cold water piston chamber.

* * * * *